US012800952B2

(12) United States Patent
Bingol

(10) Patent No.: US 12,800,952 B2
(45) Date of Patent: Nov. 17, 2026

(54) ELECTROMECHANICAL OPACITY ADJUSTMENT SYSTEM

(71) Applicant: Tusas-Turk Havacilik Ve Uzay Sanayii Anonim Sirketi, Kahramankazan (TR)

(72) Inventor: Goktug Bingol, Kahramankazan (TR)

(73) Assignee: Tusas—Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 254 days.

(21) Appl. No.: 18/892,706

(22) Filed: Sep. 23, 2024

(65) Prior Publication Data

US 2025/0123503 A1 Apr. 17, 2025

(30) Foreign Application Priority Data

Oct. 13, 2023 (TR) ............................... 2023/013009

(51) Int. Cl.

| | |
|---|---|
| ***G02F 1/01*** | (2006.01) |
| ***G02F 1/153*** | (2006.01) |
| ***G02F 1/155*** | (2006.01) |

(52) U.S. Cl.
CPC .......... *G02F 1/0128* (2013.01); *G02F 1/1533* (2013.01); *G02F 1/155* (2013.01)

(58) Field of Classification Search
CPC ....... G02F 1/0128; G02F 1/1533; G02F 1/155
See application file for complete search history.

(56) References Cited

U.S. PATENT DOCUMENTS 7,415,874 B2 8/2008 Mancosu et al.
2007/0295069 A1 * 12/2007 Mancosu ............ B60C 23/0411 73/146
2017/0316713 A1 * 11/2017 Hyman .................... B44D 3/18

FOREIGN PATENT DOCUMENTS

CN 112485950 3/2021

* cited by examiner

*Primary Examiner* — Mariam Qureshi

(57) ABSTRACT

This invention relates to a body (2), at least one part (3) made of material that converts mechanical energy into electrical energy when pressure is applied on the body (2), at least one mass (4) that provides electrical energy by applying pressure to the part (3), and a trigger (5) that activates the part (3) on the body (2).

13 Claims, 2 Drawing Sheets

ELECTROMECHANICAL OPACITY ADJUSTMENT SYSTEM

RELATED APPLICATIONS

This application claims the benefit of priority of Turkish Patent Application No. 2023/013009 filed on Oct. 13, 2023, the contents of which are incorporated by reference as if fully set forth herein in their entirety.

FIELD AND BACKGROUND OF THE INVENTION

This invention is related to the electromechanical opacity adjustment mechanism triggered by the conversion of mechanical energy into electrical energy.

Liner and harness cover equipment are used for various tasks such as protecting some cable (harness) lines and avionic systems in aircraft, providing sound insulation and fireproofing features. These equipment are mostly manufactured from composite and/or fabric materials. After the liner and harness covers are installed in their places, this cover must be opened or completely removed in order to inspect and examine the harness lines and equipment behind them. This situation can cause problems such as sealing and durability when the cover is opened. In addition, the removal process of the cover takes a long time. When mechanical effects such as pressure are applied to piezoelectric materials, they generate electricity due to their structure. This generated electricity can be transferred to other electronic equipment via cables. Electrochromic materials can change colour or their opacity can be adjusted when electrical energy is applied.

In the United States patent document numbered U.S. Pat. No. 7,415,874B2 in the state of the art, a system that generates electrical energy through the movement of a vehicle tire is mentioned. As the vehicle moves, the plate made of piezoelectric material in the chamber inside the tire is exposed to oscillating loads and generates electricity.

In the patent document numbered CN112485950A of the People's Republic of China origin in the state of the art, a system using electrochromic material is mentioned. A piezoelectric material is attached to the electrochromic plate. The electrochromic material changes colour by applying pressure to the pressure plate.

SUMMARY OF THE INVENTION

With the present invention, it is aimed to effectively change the opacity of the parts with electromechanical systems by means of an electromechanical opacity adjustment system developed.

Another aim of this invention is to provide the opacity of the structural parts in the aircraft to be adjusted according to the user's preference.

Another aim of this invention is to provide the opacity adjustment of the parts in a cost-effective way by converting only mechanical energy into electrical energy without using extra electronic systems.

Another aim of this invention is to provide the visibility of the back of the cover by adjusting only the opacity of the covers without removing them in order to see areas such as the aircraft avionics system box, cargo storage and harness.

The electromechanical opacity adjustment system, which is realised to achieve the aim of the invention and defined in the first claim and the claims dependent on this claim, comprises at least one part obtained from a material that is triggered when pressure is applied to it and converts mechanical energy into electrical energy due to its structure, at least one mass that provides the generation of voltage by applying mechanical energy to the part, and a trigger that triggers the part positioned on the body and enables it to move.

The electromechanical opacity adjustment system that is the subject of the invention comprises a part which surrounds the mass almost partially contacting it to form a closed volume in the form of a chamber in which the mass in the form of a sphere is placed, a mass that moves almost freely in the space inside the part that is set in motion when the trigger is triggered by the user and exerts pressure by striking the inner walls of the part, and a part which converts mechanical energy into electrical energy with the triggering of this pressure.

In one embodiment of the invention, the electromechanical opacity adjustment system comprises a trigger that rotates the part around the centre it is supported by, and masses that rotate and move in the space inside the part due to the centrifugal force created by the trigger's continuous rotation around itself as long as it rotates.

In one embodiment of the invention, the electromechanical opacity adjustment system comprises a part that generates tension by means of the pressure created by the application of mechanical energy to the inner walls of the masses under the effect of centrifugal force in an oscillatory manner with a frequency value previously determined by the user.

In one embodiment of the invention, the electromechanical opacity adjustment system comprises a plate that is located on the body made of material whose opacity or colour changes with the triggering of electrical energy, and a cable that conducts the electricity generated by the part, one end of which touches the part and the other the plate.

In one embodiment of the invention, the electromechanical opacity adjustment system comprises at least one electrode that is positioned on the plate in a way that it will be in contact with the plate and enables the electricity generated by the part to be transmitted to the plate by the cable, and at least one structural element formed by the plate and the electrode, the opacity of which can be adjusted by the user by means of the triggering of electrical energy.

In one embodiment of the invention, the electromechanical opacity adjustment system comprises a shaft that is positioned on the body and enables the trigger to move, and a crank that is in the form of a rod, extends from the axis to which the shaft is supported, and is rotated by the user.

In one embodiment of the invention, the electromechanical opacity adjustment system comprises a structural element that allows the user to adjust the voltage produced by the part and therefore its opacity according to the angular speed or frequency of the rotation of the crank.

In one embodiment of the invention, the electromechanical opacity adjustment system comprises a part made of piezoelectric material.

In one embodiment of the invention, the electromechanical opacity adjustment system comprises a plate made of electrochromic material.

In one embodiment of the invention, the electromechanical opacity adjustment system comprises at least one control unit that is positioned on the body and triggers the trigger.

In one embodiment of the invention, the electromechanical opacity adjustment system comprises a control unit that is triggered by the user pressing a button on the body, and a shaft that is triggered by a motor operated by the control unit.

In one embodiment of the invention, the electromechanical opacity adjustment system comprises a structural element that stores the electrical energy transmitted by the electrode and enables its use, and at least one storage device that is placed on the plate.

In one embodiment of the invention, the electromechanical opacity adjustment system comprises a structural element that acts as a cover for room-shaped volumes such as cable box, cargo box, liner, harness, and avionics box on the body of the aircraft.

BRIEF DESCRIPTION OF SEVERAL VIEWS OF THE DRAWINGS

The electromechanical opacity adjustment system implemented to achieve the aim of this invention is shown in the attached figures, and of these figures.

DESCRIPTION OF SPECIFIC EMBODIMENTS OF THE INVENTION

Figure 1:
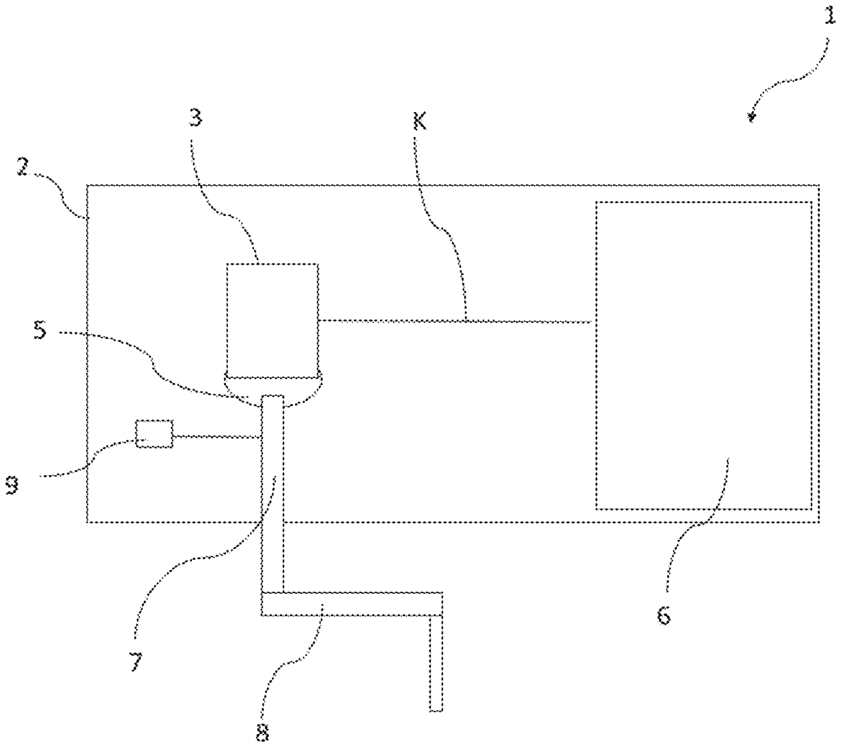
FIG. 1 shows sectional view of the electromechanical opacity adjustment system.

The parts in the figures are numbered one by one and the equivalents of these numbers are given below.

1. Electromechanical opacity adjustment system
2. Body
3. Part
4. Mass
5. Trigger
6. Structural element
601. Plate
602. Electrode
7. Shaft
8. Crank
9. Control Unit
10. Button
11. Motor
(D) Storage Device
(K) Cable The electromechanical opacity adjustment system (1) comprises a body (2), at least one part (3) that is made of material that converts mechanical energy into electrical energy when pressure is applied to it and is located on the body (2), at least one mass (4) that provides electrical energy by applying pressure to the part (3), and a trigger (5) that is located on the body (2) and activates the part (3).

The electromechanical opacity adjustment system (1) that is the subject of the invention comprises a mass (4) that has a spherical form, a part (3) in the form of a chamber that surrounds the mass (4) to form a closed volume, the mass (4) that moves freely within the part (3) and hits the inner wall of the part (3) when the trigger (5) triggered by the user moves the part (3) and the part (3) that converts mechanical energy into electrical energy by applying pressure on the moving mass (4).

On a body (2), there is at least one part (3) made of a type of material that converts the applied mechanical energy into electrical energy when any pressure or mechanical energy is applied to it. A mass (4) applies pressure on the part (3) and enables the part (3) to obtain electrical energy. A trigger (5) that is located on the body (2) triggers the part (3) and enables it to move.

Said masses (4) have a spherical form. The part (3) creates a closed volume on the masses (4) by surrounding the masses (4). The part (3) is in the form of a chamber in which the masses (4) are located and the masses (4) can move freely in the space inside the part (3) as a result of the movement of the part (3) triggered by the trigger (5). The masses (4) move towards the inner wall of the part (3) and hit the inner walls. Pressure is applied as a result of the masses (4) hitting the inner wall. The part (3) converts this applied pressure into electrical energy. In this way, as a result of the movement of the part (3), electrical energy is obtained with the help of masses (4).

Figure 2:
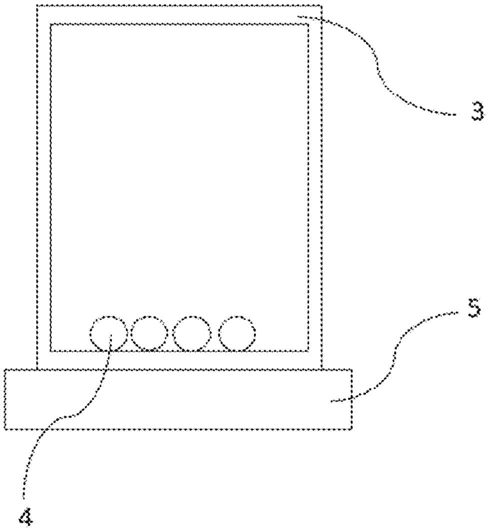
FIG. 2 shows sectional view of the part, trigger and masses.

In one embodiment of the invention, the electromechanical opacity adjustment system (1) comprises a trigger (5) that rotates the part (3) around its central axis, and masses (4) that move inside the part (3) as a result of the centrifugal force effect as a result of the trigger (5) continuously rotating around its central axis during the triggered period. The trigger (5) rotates and moves the part (3) around the central axis it extends. The masses (4) remain under the effect of centrifugal force during the period when the trigger (5) rotates the part (3) and continuously apply pressure to the inner wall of the part (3). In this way, electrical energy is generated during the rotation movement of the part (3). (FIG. 1, FIG. 2)

In one embodiment of the invention, the electromechanical opacity adjustment system (1) comprises the part (3) that converts mechanical energy into electrical energy as a result of the repeated pressure applied by the masses (4) that move with the centrifugal force with a frequency value predetermined by the user to its inner wall. The masses (4) moving with the effect of centrifugal force apply pressure to the inner wall of the part (3) repeatedly with a frequency value predetermined by the user. In this way, the part (3) can convert mechanical energy into electrical energy.

In one embodiment of the invention, the electromechanical opacity adjustment system (1) comprises a plate (601) that is made of material whose opacity changes with electrical energy and is located on the body (2), and a cable (K) that is connected at one end to the part (3) and at the other end to the plate (601), and transmits the electrical energy produced by the part (3). On the body (2), there is a plate (601) that is made of material the opacity or colour of which changes as a result of being triggered by electricity. The connection between the part (3) and the plate (601) is provided by a cable (K). In this way, electrical energy transmission is provided between the part (3) and the plate (601).

Figure 3:
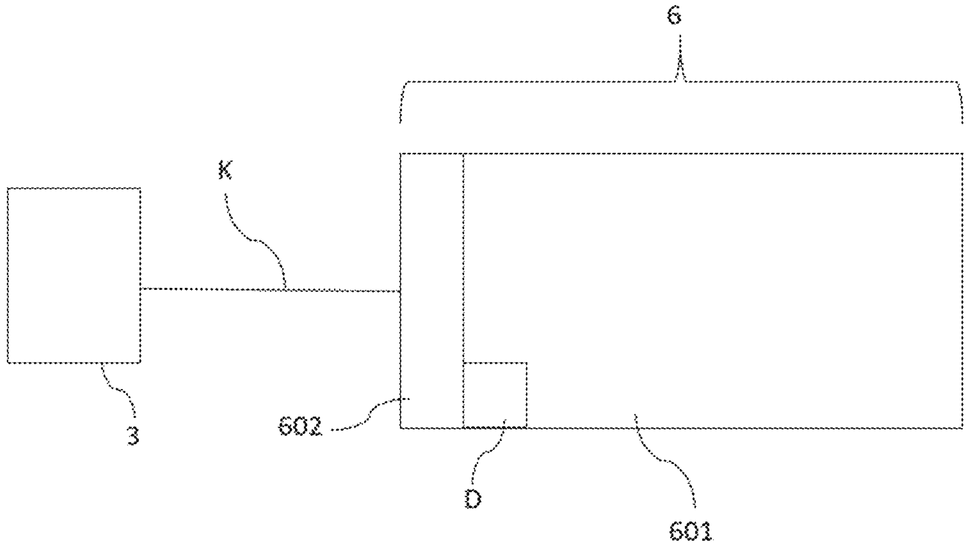
FIG. 3 shows sectional view of the part, cable and structural element.

In one embodiment of the invention, the electromechanical opacity adjustment system (1) comprises at least one electrode (602) that is located on the plate (601) and enables the cable (K) to transfer the electrical energy produced by the part (3) to the plate (601), and at least one structural element (6) that is located on the body (2), consists of the plate (601) and the electrode (602), and the opacity of which can be adjusted by the user by transferring the electrical energy. There is at least one electrode (602) located on the plate (601). The electricity coming from the cable (K) is transferred to the plate (602) by means of the electrode (602) that is in contact with the cable (K). At least one structural element (6) that is located on the body (2) consists of a plate (601) and an electrode (602). In this way, the electrical energy generated by the part (3) is transferred to the structural element (6). (FIG. 3)

In one embodiment of the invention, the electromechanical opacity adjustment system (1) comprises a shaft (7) that is located on the body (2) and moves the trigger (5), a crank (8) that is in the form of a rod extending outward from the rotation centre of the shaft (7) and is rotated by the user. A shaft (7) that is located on the body (2) moves the trigger (5). The user triggers a crank (8) that is in the form of a rod extending outward from the axis to which the shaft (7) extends. In this way, the user is enabled to move the part (3) and generate electrical energy.

In one embodiment of the invention, the electromechanical opacity adjustment system (1) comprises a structural element (6) the opacity of which can be adjusted by the user according to the rotation intensity of the crank (8), by the part (3) generating electrical energy. Thus, the user can easily adjust the opacity of the structural element (6) by turning the crank (8).

In one embodiment of the invention, the electromechanical opacity adjustment system (1) comprises a part (3) made of piezoelectric material. Thus, the part (3) can convert the mechanical energy applied to it into electrical energy by means of its material structure.

In one embodiment of the invention, the electromechanical opacity adjustment system (1) comprises a plate (602) made of electrochromic material. Thus, when electrical energy is applied to it, the plate (601) can change its opacity by means of its structure.

In one embodiment of the invention, the electromechanical opacity adjustment system (1) comprises at least one control unit (9) that is located on the body (2) and enables the trigger (5) to be triggered. In this way, the trigger (5) can be triggered automatically with the control unit (9).

Figure 4:
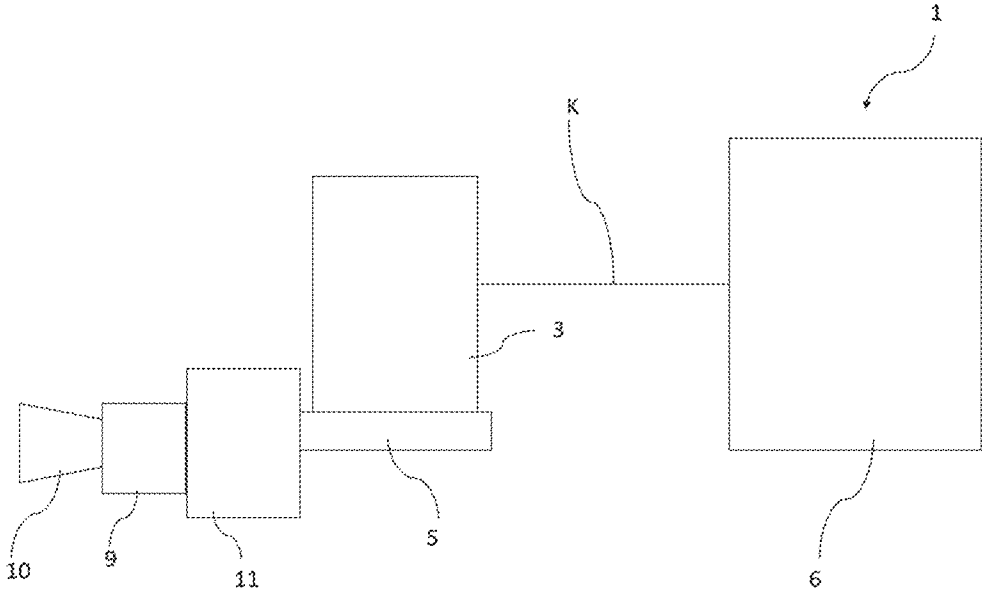
FIG. 4 shows sectional view of the electromechanical opacity adjustment system.

In one embodiment of the invention, the electromechanical opacity adjustment system (1) comprises a button (10) that is located on the body (2), a control unit (9) triggered by the user pressing the button (10), a motor (11) triggered by the control unit (9), and a shaft (7) moved by the motor (11). A signal is transmitted to the control unit (9) when a button (10) on the body (2) is activated by the user. The control unit (9) operates a motor (11) with the signal it receives. The motor (11) rotates the shaft (7) and enables the trigger (5) to move. In this way, the trigger (5) moves the part (3) and generates electricity. (FIG. 4)

In one embodiment of the invention, the electromechanical opacity adjustment system (1) comprises at least one storage device (D) that is located on the structural element (6), stores the electrical energy transmitted by the electrode (602) and enables it to be used when necessary. In this way, the opacity of the plate (601) is changed by electrical energy stored by the storage device (D) in cases where part (3) cannot be used or is faulty. (FIG. 3)

In one embodiment of the invention, the electromechanical opacity adjustment system (1) comprises a structural element (6) that acts as a cover for areas such as the cable box and cargo box on the aircraft body (2). In this way, the structural element (6) is made transparent without being moved, allowing the user to see the equipment behind it.

The invention claimed is:

1. An electromechanical opacity adjustment system (1) comprising a body (2), at least one part (3) that is located on the body (2) and is made of material that converts mechanical energy into electrical energy when pressure is applied onto it, at least one mass (4) that provides electrical energy by applying pressure to the part (3), and a trigger (5) that is located on the body (2) and activates the part (3), wherein the mass (4) which has a spherical form, the part (4) that surrounds the mass (4) to form a closed volume and is in the form of a chamber, the mass (4) that moves freely within the part (3) and hits the inner wall of the part (3) when the trigger (5) triggered by a user moves the part (3), and the part (3) that converts mechanical energy into electrical energy by applying pressure on the moving mass (4).

2. An electromechanical opacity adjustment system (1) according to claim 1, wherein a trigger (5) that rotates the part (3) around its central axis, and masses (4) that move inside the part (3) as a result of the centrifugal force effect as a result of the trigger (5) continuously rotating around its central axis during the triggered period.

3. An electromechanical opacity adjustment system (1) according to claim 1, wherein the part (3) that converts mechanical energy into electrical energy as a result of the repeated pressure applied by the masses (4) that move with the centrifugal force with a frequency value predetermined by the user to its inner wall.

4. An electromechanical opacity adjustment system (1) according to claim 1, wherein a plate (601) that is made of material whose opacity changes with electrical energy and is located on the body (2), and a cable (K) that is connected at one end to the part (3) and at the other end to the plate (601), and transmits the electrical energy produced by the part (3).

5. An electromechanical opacity adjustment system (1) according to claim 4, wherein at least one electrode (602) that is located on the plate (601) and enables the cable (K) to transfer the electrical energy produced by the part (3) to the plate (601), and at least one structural element (6) that is located on the body (2), consists of the plate (601) and the electrode (602), and the opacity of which can be adjusted by the user by transferring the electrical energy.

6. An electromechanical opacity adjustment system (1) according to claim 1, wherein a shaft (7) that is located on the body (2) and moves the trigger (5), a crank (8) that is in the form of a rod extending outward from the rotation centre of the shaft (7) and is rotated by the user.

7. An electromechanical opacity adjustment system (1) according to claim 6, wherein a structural element (6) the opacity of which can be adjusted by the user according to the rotation intensity of the crank (8), by the part (3) generating electrical energy.

8. An electromechanical opacity adjustment system (1) according to claim 1, wherein the part made of piezoelectric material (3).

9. An electromechanical opacity adjustment system (1) according to claim 5, wherein the plate made of electrochromic material (602).

10. An electromechanical opacity adjustment system (1) according to claim 1, wherein at least one control unit (9) that is located on the body (2) and enables the trigger (5) to be triggered.

11. An electromechanical opacity adjustment system (1) according to claim 6, wherein a button (10) that is located on the body (2), a control unit (9) triggered by the user pressing the button (10), a motor (11) triggered by the control unit (9), and a shaft (7) moved by the motor (11).

12. An electromechanical opacity adjustment system (1) according to claim 4, wherein at least one storage device (D) that is located on the structural part (6), stores the electrical energy transmitted by the electrode (602) and allows it to be used when necessary.

13. An electromechanical opacity adjustment system (1) according to claim 4, wherein the structural element (6) that serves as a cover for areas such as the cable box and cargo box on the body (2) which is an aircraft.

* * * * *